United States Patent Office 2,841,910
Patented July 8, 1958

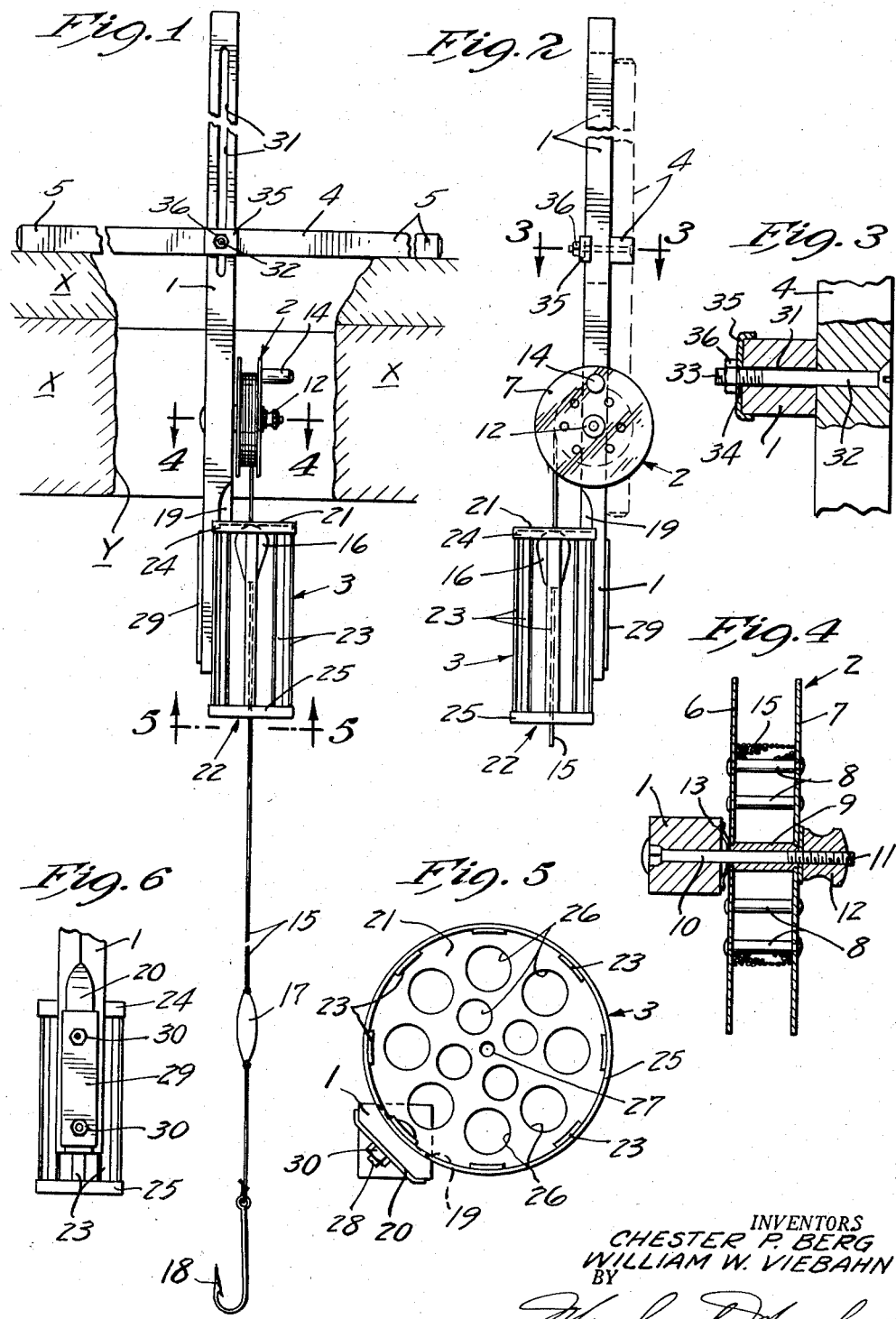

2,841,910
ICE FISHING APPARATUS

Chester P. Berg, Minneapolis, and William W. Viebahn, Duluth, Minn.

Application October 27, 1955, Serial No. 543,144

2 Claims. (Cl. 43—4)

Our invention relates generally to fishing tackle and more particularly to a device for supporting a fish line when fishing through a hole in the ice covering a body of water during the winter season.

It is well known among fishermen, that, during cold weather, a thin layer of ice tends to form on the surface of the water within a hole cut in the ice by a fisherman, and that this thin layer must be prevented from forming, or broken up and removed at frequent intervals, in order to prevent the fish line from becoming frozen or otherwise entangled therein.

An important object of our invention is the provision of novel means for supporting a fish line, when angling through a hole in the ice, so that the line in its entirety is submerged to an extent that ice forming at the surface does not touch the line.

Another object of our invention is the provision of an elongated rod having a fish line reel mounted thereon and a supporting device engageable with the upper surface of the ice surrounding the hole therein for supporting the reel below the surface of the water.

Another object of our invention is the provision of fishing apparatus of the type set forth having novel means for receiving and confining a float or bobber attached to the fish line to prevent the same from floating to the surface of the water and permitting free movement of the bobber downwardly therefrom when a fish becomes hooked to the line.

A still further object of our invention is the provision of bobber-receiving means as set forth having a transparent upper end by means of which the bobber is clearly visible to an observer on the ice adjacent the hole therein.

Another object of our invention is the provision of fishing apparatus of the above type which may be quickly and easily set up for use, and which may be as readily folded to a relatively compact unit for transfer and storage.

Still another object of our invention is the provision of ice fishing apparatus as set forth which is relatively simple and inexpensive to manufacture, which is highly efficient in operation and which is rugged in construction and durable in use.

The above and still further highly important objects and advantages of our invention will become apparent from the following detailed specification, appended claims and attached drawings.

Referring to the drawings, which illustrate the invention, and in which like characters indicate like parts throughout the several views:

Fig. 1 is a view in front elevation of fishing apparatus built in accordance with our invention and positioned in a hole in the ice on a body of water, some parts being broken away and some parts shown in section;

Fig. 2 is a view in side elevation of the fishing apparatus of Fig. 1, some parts being broken away;

Fig. 3 is an enlarged fragmentary section taken substantially on the line 3—3 of Fig. 2;

Fig. 4 is an enlarged fragmentary section taken substantially on the line 4—4 of Fig. 1;

Fig. 5 is an enlarged view in bottom plan as seen from the line 5—5 of Fig. 1, some parts being removed; and Fig. 6 is a fragmentary view in elevation of the lower end portion of our fishing apparatus.

In the preferred embodiment of our invention illustrated, the numeral 1 indicates a generally vertically disposed elongated rod having mounted thereon a reel 2. A downwardly opening cage-like receptacle 3 is rigidly secured to the lower end portion of the rod 1, and a supporting member or bar 4 is pivotally secured to the rod 1 above the receptacle 3, and preferably above the reel 2, said bar 4 having opposite end portions 5 adapted to engage and rest upon the snow or ice X surrounding a hole Y cut in the ice on a body of water, with the rod 1 projecting downwardly through the hole Y.

The reel 2 comprises a pair of laterally spaced circular end flanges 6 and 7 maintained in axially spaced relationship by a plurality of circumferentially spaced axially extending spool-forming pins or the like 8 and a central tubular spindle or the like 9. A shaft in the nature of a threaded bolt 10 extends transversely through the rod 1 and through the tubular spindle 9 whereby to journal the reel 2 for rotation on a horizontal axis, and has a threaded outer end portion 11 upon which is screw threaded a washer-equipped adjustment nut 12. A resilient friction member, in the nature of a spring washer 13, is mounted on the shaft or bolt 10 between the end flange 6 of the reel 2 and the adjacent side of the rod 1, and is adapted to have braking engagement with the outer surface of the end flange 6 at the central portion thereof. This braking engagement may be varied by adjustment of the nut 12 on the bolt 10. An operating handle 14 projects in a direction axially outwardly from the end flange 7, and is adapted to be utilized by the operator in winding a conventional fish line 15 on the reel. With reference to Fig. 1, it will be seen that the fish line 15 is provided with a conventional float or bobber 16, a weight or sinker 17 and fish hook 18. The reel, above-identified and illustrated in the drawings, may be of any suitable construction or any one of several available on the present market. The reel, in itself, does not constitute the instant invention and is but a preferred example of a simple type thereof.

The rod 1, at its lower end portion, is chamfered to provide a pair of opposed beveled surfaces 19 and 20 to the former of which is secured the downwardly opening receptacle 3. Preferably, the receptacle 3 is generally cylindrical in form and may be made from any suitable material such as metal or synthetic resin whereby to provide a top element 21 and an open bottom 22. For the purpose of the present example, the receptacle 3 is shown as including a plurality of longitudinally extending circumferentially spaced rods or bars 23 connected at their upper ends to a downturned flange 24 of the upper end-forming member 21, and at their lower ends to an annular band 25. Preferably, the member 21 is rendered transparent by a number of perforations 26 for a purpose which will hereinafter become apparent. If desired, the member 21 may be made from transparent material such as synthetic resin. The member 21 is further provided at its central portion with an axial opening 27 underlying the reel 2, whereby to provide a passage for the free movement of the fish line 15 therethrough. The receptacle 3 is of a size to freely receive the float or bobber 16, the diameter of the opening 27 being of considerably smaller size than that of the bobber 16. A pair of bolts 28 extend through suitable aligned apertures in one of the bars 23 of the receptacle 2 and the lower beveled end portion of the rod 1. A metallic reinforcing plate 29 engages the beveled surface 20 of the rod 1 and is also provided with a pair of spaced apertures, not shown, through which the bolts 28 extend. A pair of lock nuts 30 are screw threaded on the outwardly projecting ends of the mounting screws 28 and engage the plate 29 to securely anchor the receptacle 3 in position.

The rod 1 is provided with a transverse slot 31 above the reel 2, said slot being elongated in a direction longitudinally of the rod 1, see Fig. 1. A pivot bolt 32 extends transversely through the central portion of the supporting bar 4 and through the slot 31 whereby to provide a pivotal mounting for the bar 4, whereby the bar 4 may be swung between an operative position normal to the longitudinal dimension of the rod 1, as shown in Fig. 1, and an inoperative position parallel to the rod 1 as indicated by dotted lines in Fig. 2. The pivot bolt 32 has a threaded end 33 which extends laterally outwardly of the slot 31 and through a central opening 34 in a flanged plate-like slide member 35 that engages the adjacent side of the rod 1 at opposite sides of the slot 31 therein. A lock nut 36 is screw threaded on the threaded end 33 of the pivot bolt 32 and may be tightened to an extent to prevent sliding movements of the pivot bolt 32 and supporting bar 4 longitudinally of the rod 1, but to permit pivotal movements of the bar 4 with respect to the rod 1. Loosening of the nut 36 permits adjustment of the bar 4 longitudinally of the rod 1 whereby to vary the depth at which the reel 2 and receptacle 3 may be positioned with respect to the surface of the water within the hole Y in the ice X. In operation, our novel fishing apparatus is placed in the hole Y with the outer end portions 5 resting on the snow or ice surrounding the hole, the bar 4 being positioned on the rod 1 so that the receptacle 3 and the reel 2 are totally submerged in the water within the hole Y or therebelow. The transparency of the top member 21 of the receptacle, afforded by the apertures 26 therein, render the bobber 16 clearly visible to the observer. The adjustment nut 12 is set to cause the spring washer 13 to impart the desired drag against the reel 2 so that, when a fish is caught on the hook 18 and it begins to strip line 15 from the reel 2, backlash is prevented from occurring. When a fish does take the bait on the hook 18 and begins to swim away with the hook in its mouth, the fisherman can easily see the bobber descending downwardly in the receptacle 3, whereupon the upper end portion of the rod 1 is grasped to raise the apparatus from the hole Y. The handle 14 of the reel 2 may then be engaged by the operator to reel in the fish. As above indicated, during extremely cold weather, a film of ice tends to form on the surface of the water within the hole Y, particularly when an appreciable interval occurs between the time of placement of the apparatus in the hole and engagement of the hook 18 by a fish. When a fish does bite on the hook 18, it is an easy matter for the fisherman to break the rod 1 loose from the thin film of ice and remove the apparatus from the hole Y. Thus, with the entire line submerged below the surface of the water, the above-mentioned thin film of ice does not affect the line nor become a hazard thereto. Moreover, our novel fishing apparatus eliminates the necessity of frequent agitation of the water within the hole and straining therefrom ice particles or slush.

When not in use, the supporting bar 4 is pivotally moved about the axis of the pivot bolt 32 to its dotted line position of Fig. 2. In this position of the bar 4, the entire apparatus takes very little space for transportation or storage.

Our invention has been thoroughly tested and found to be completely satisfactory for the accomplishment of the objectives set forth; and while we have shown and described a preferred embodiment of our novel fishing apparatus, it will be understood that the same is capable of modification without departure from the spirit and scope of the invention as defined in the claims.

What we claim is:

1. Ice fishing apparatus comprising, an elongated rod adapted to extend generally vertically through a hole in the ice on a body of water, a fish line reel, means mounting said reel to one side of said rod for rotation on a horizontal axis intermediate the ends of the rod, a downwardly opening receptacle secured to the rod between said reel and the lower end of the rod, said receptacle being of a size to freely receive a fishing bobber through its open lower end, said receptacle having a transparent upper end through which said bobber is visible when the bobber is disposed within the receptacle, said transparent upper end having an opening formed therein for free passage therethrough of a fish line attached to said bobber and wound on said reel, said opening being of a smaller diameter than said bobber, the axis of said opening being parallel to the rod and substantially tangent to the windings of a fish line when the line is wound on said reel, and means carried by the rod above said reel and having outwardly extended supporting portions located above the plane of the top of the reel and engageable with the upper surface of the ice surrounding said hole for supporting the rod in the hole with the receptacle and reel positioned below the surface of the water in the hole.

2. Ice fishing apparatus comprising, an elongated rod adapted to extend vertically through a hole in the ice on a body of water, a fish line reel mounted on said rod intermediate the ends thereof, a downwardly opening receptacle secured to the rod between said reel and the lower end of said rod, said receptacle being of a size to freely receive a fishing bobber through its open lower end, said receptacle having a transparent upper end through which said bobber is visible when the bobber is disposed within the receptacle, said transparent upper end having an opening for free passage therethrough of a fish line attached to said bobber and wound on said reel, said opening being of smaller diameter than said bobber, a rod supporting bar having its opposite ends engageable with the upper surface of the ice surrounding the hole, and means intermediate the ends of said supporting bar pivotally mounting the same to said rod on a horizontal axis above the plane of the top of said reel for movements between an operative rod supporting position normal to the rod and an inoperative position parallel to the rod, said bar in its operative position supporting the rod in the hole with said receptacle and reel positioned below the surface of the water in the hole, said rod having a transverse slot extending longitudinally thereof, said means comprising a pivot bolt extending laterally outwardly of the bar through said slot, a slide member mounted on said bolt and engaging the side of the rod opposite said bar and at opposite sides of said slot, and a locking nut screw-threaded on said bolt outwardly of said slide member and operative to frictionally hold said bar and slide member against sliding movement longitudinally of the rod but permitting said pivotal movements of said bar relative to the rod, loosening of said locking nut permitting sliding movement of the bar longitudinally of the rod to vary the depth at which said receptacle and reel are positioned in the hole.

References Cited in the file of this patent

UNITED STATES PATENTS

| | | |
|---|---|---|
| 2,448,346 | Baugh et al. | Aug. 31, 1948 |
| 2,684,509 | Couturier | July 27, 1954 |
| 2,691,840 | Smith | Oct. 19, 1954 |